Patented Sept. 25, 1945

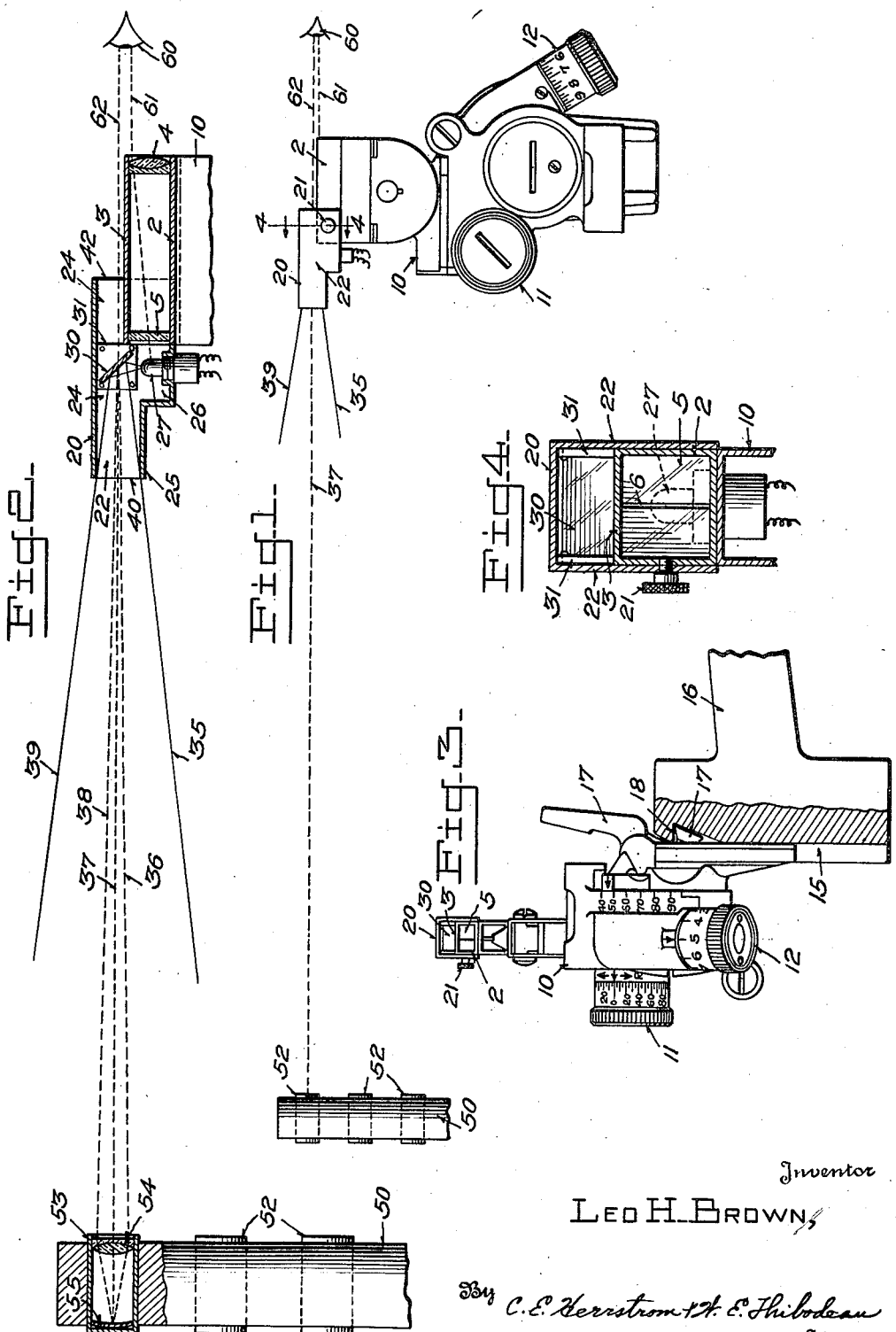

2,385,343

UNITED STATES PATENT OFFICE 2,385,343

FIRE CONTROL MEANS

Leo H. Brown, Glenville, Conn.

Application May 20, 1944, Serial No. 536,589

3 Claims. (Cl. 88—2.2)

(Granted under the act of March 3, 1883, as
amended April 30, 1928; 370 O. G. 757)

The invention described herein may be manufactured and used by or for the Government for governmental purposes without the payment to me of any royalty thereon.

The present invention relates to fire control means for mortars, howitzers, and cannon in general.

Among the objects of the present invention is the provision of a collimator sight that enables the control of the azimuth of the line of fire by day as well as at night.

Another object of the present invention is the provision of a collimator sight for use in indirect firing of a mortar or cannon particularly at night.

A further object of the present invention is the provision of a collimator sight for use at night in connection with an aiming post, which while cooperating with the line of sight of the collimator sight to establish a line of reference for the azimuth of a mortar or cannon, is practically incapable of detection by an enemy but nevertheless distinctly visible from the collimator sight.

Further objects of the invention are either pointed out in, or are obvious from, the detailed description of the invention hereinafter given.

The invention utilizes among its elements a collimator or collimator sighting means of any suitable design having a reticle, e. g., a narrow slit, for the passage of light therethrough, located at the focus or in the focal plane of the objective or collimating lens, whereby an eye observing the reticle or slit through the objective, sees an image of the reticle or slit in space away from the collimator, and generally referred to as being at an infinite distance from the eye of the observer, owing to the fact that the rays of light which enter the eye to give the sensation of this image are parallel or substantially parallel.

The invention also utilizes means for illuminating the reticle of the collimator, and for this purpose a small electric light bulb connected with a suitable source of electricity may be used.

In connection with the above mentioned instrumentalities, the invention utilizes a mirror or reflector which partly reflects and partly transmits light incident thereon, and which, for example, may be a so called half silvered mirror or reflector, that is to say, a silvered mirror so formed that it transmits half of the light incident thereon and reflects the other half. This mirror or reflector is so mounted in relation to the line of sight of the collimator and to the means for illuminating the reticle, that it reflects light from the illuminating means along the line of sight of the collimator. This reflector is advantageously small, and preferably consists of a plate of glass or of transparent plastic material with a plane flat reflecting surface and a plane flat surface parallel with the reflecting surface. Means for restricting the size and visibility of this beam of reflected light is used. This means preferably consists of a hood over the reflector and having two sides parallel with line of sight of the collimator. This hood is open at its forward end and rear end, and so fitted upon the collimator that the hood forms with the top of the collimator a channel for light, in which the said reflector is positioned so that it receives light from the illuminating means for the reticle and reflects it along the line of sight of the collimator.

Forming part of the combination of means of the invention is an aiming post of particular construction for cooperation with the instrumentalities hereinbefore described in placing a mortar or cannon, in connection with which the invention is employed, in the desired azimuthal position. This aiming post or stake comprises (1) a rod of wood or other suitable material, which may be planted or stuck into the ground at a distance from the instrumentalities previously described; and (2) one or more separate optical systems, each consisting of a converging lens or lens combination and a convex reflector at the focus of the converging lens or substantially so, the curvature of said reflector being such that the rays of light entering the converging lens and emerging therefrom towards the said curved mirror, which has its reflecting concave surface towards the converging lens, are brought to focus thereon. Therefore, light rays brought to focus on any portion of said concave surface are reflected back in reverse direction through the converging lens back towards their source. These reflected rays emerging from the lens are substantially parallel, or at any event the relation between the position of the concave mirror and the position of the source of the light rays is one of conjugate foci. Where the distance between the position of the converging lens and the source of the light rays is great and the focal length of the converging lens is small in comparison with the said distance, it becomes apparent that while the relation of conjugate foci may exist, the said concave mirror, as a practical matter, lies at, or substantially at, the principal focus of the converging lens.

The collimator above mentioned together with the hood and reflector therein and with the illuminating means are all mounted together as a unit on any suitable means which enables the line of sight of the collimator to be placed at various angles in a horizontal plane and at various angles in a vertical plane, so that the line of sight of the collimator may occupy different angular positions in horizontal as well as in vertical planes. This means is connected with a portion of the mortar or cannon, which moves in azimuth with the mortar or cannon when the mortar or cannon is moved through a horizontal angle, so that the horizontal angular direction of fire of the mortar or cannon can be controlled by means of the apparatus herein described.

The accompanying drawing forming part of this description illustrates an embodiment of the invention. In the drawing, wherein the same reference character indicates the same or corresponding part, Fig. 1 is a side elevation of the fire control means according to the present invention.

Fig. 2 is a vertical longitudinal section of the means shown in Fig. 1 on an enlarged scale omitting parts below the collimator sight.

Fig. 3 is an end view looking from the right of Fig. 1, showing also a part of a traversing yoke of a mortar partly in section.

Fig. 4 is a section on the line 4—4 of Fig. 1, on an enlarged scale.

Referring now in detail to the drawing, a collimator or collimator sight is indicated generally by the numeral 2 and comprises a tube 3 of rectangular cross section in which at one end there is the collimating compound lens 4 and at the opposite end a transparent reticle plate 5. The surface of plate 5 on which the reticle is carried or engraved is at the focus of lens 4. The reticle is advantageously formed by coating the surface on which it is to be placed with an opaque material, and then removing the said opaque material along a very narrow line or a plurality of such lines to form a reticle figure. A single line reticle is indicated by the numeral 6 in Fig. 4.

The collimator 2 is carried on a mounting indicated generally by the numeral 10 in the various views. This mounting comprises means for traversing the collimator sight and means for elevating it, and may be of any suitable or desired construction. The specific construction of the mounting forms no part of the invention. Rotation of the head 11 of the mounting 10 traverses the collimator 2, and rotation of the head 12 of the mounting 10 elevates the said collimator. These two heads are appropriately graduated in mils or degrees, as desired. This mounting may be detachably attached to the part of a mortar or cannon intended to carry it, and in Fig. 3 the mounting 10 is shown, by way of example, detachably secured in a slot 15 in the traversing yoke 16 of a trench mortar. The mounting 10 is held in position on the yoke 16 by means of a spring pressed latch 17 engaging a shoulder 18 on the yoke 16.

A hood 20 fits over the collimator 2 and is detachably secured thereto by means of a thumb screw 21. The hood 20 comprises vertical side walls 22 which are connected across their tops by means of a top wall or ceiling. The hood extends partly over the collimator 2, as shown in Figs. 1 and 2 and partly forwardly of it to provide a passage or channel 24 for the passage of light and for sighting in connection with the image of the reticle provided by the collimator 2.

The forward portion of the hood 20 is provided with a bottom 25, in which a well 26 is provided for an electric light bulb 27 which has as one of its functions the illumination of the reticle on the reticle plate 5. The light bulb 27 is located before the reticle and a short distance therefrom.

In the hood 20, across the channel 24, is fixed a plane reflector 30 which partially transmits light and partially reflects light. For example this reflector may be a so-called half silvered plane mirror which reflects fifty percent and transmits fifty percent of light incident thereon. Reflector 30 is carried by a pair of plates 31 which are riveted or otherwise secured to the side walls 22 of the hood 20. The reflector 30 is located above the light bulb 27 and is inclined at an angle of 45° to the longitudinal axis of the collimator sight 2.

The bottom of the portion of the hood 20 which extends over the collimator 2 is open, so that the hood 20 may be placed over the collimator 2, as shown in Figs. 1 and 2, and secured in the position shown by means of the engagement of threads of the thumb screw 21 with threads in the wall of the collimator. Any other desired means for securing the hood 20 on the collimator 2 may be used instead of the thumb screw 21.

Light from the electric light 27 strikes the reflector 30 and is reflected thereby out of the forward end of channel 24. A few of these reflected light rays are indicated by means of the numerals 35, 36, 37, 38 and 39. The hood 20, well 26 and the forward part of the collimator 2, completely enclose the light bulb 27 by solid walls, so that light emitted from the light bulb only proceeds forwardly and outwardly from the hood 20 by passage through the forward opening 40 of the channel 24. The channel 24, as shown, also has a rear opening 42 in alignment with the opening 40. Channel 24 and openings 40 and 42 therefore provide a line of sight through the hood 20 above the collimator 2 parallel to the line of sight of the collimator sight 2.

In Figs. 1 and 2 there are shown an aiming post 50 for use in connection with the instrumentalities heretofore described. The aiming post comprises a rod of wood or of other material and may be several feet long with a pointed lower end (not shown) to enable it to be planted or stuck into the ground vertically at a distance from the instrumentalities described above. In Figs. 1 and 2 only the top or upper end portion of the aiming post 50 is shown, and in this upper portion, in suitable openings or holes passing diametrically through the posts are fixed three optical systems 52. The longitudinal axes of the three optical systems are substantially parallel owing to the fact that the axes of the said openings are substantially parallel. Preferably the axes of the said openings are so disposed that they are not only parallel but also lie in the same vertical plane when the aiming post is plumb. While three of said optical systems 52 are shown in the drawing, it is to be understood that a lesser or greater number of them can be associated in like relationship in the aiming post 50.

Each of the optical systems 52 is essentially means for reflecting light or a form of a reflector. Each of the systems consists of tube 53 fitting tightly in the openings or passages of the aiming post. At one end of each of the tubes 53 is a compound converging lens 54 and at the other end of the tube is a convex mirror or reflecting surface 55, with its convex reflecting surface facing the lens 53, so that light reflected by the reflecting surface 55 enters the lens 54 for transmission away from the optical system 52.

The position of the convex reflector 55 with reference to the lens 54 and the curvature of the said reflector have been described above.

In using the invention the eye 60 of the user is positioned so as to direct the sight of the eye simultaneously into the collimator 2 and through the channel 24, as indicated by the lines 61 and 62. Light from the light bulb strikes the reflector 30 which partly reflects and partly transmits light, and owing to its reflecting properties, reflects light to one of the lenses 54 on the aiming post 50. Lens 54 brings the light entering it from the light bulb 27 into focus on the convex reflector 55, which reflects it back through the lens 54 into the channel 24 where it strikes the light transmitting reflector 30.

Light then proceeds through the reflector 30 to the eye 60 of the user. The paths of light rays which so proceed from the light bulb 27 to the aiming post and which return into the channel 24 and enter the eye 60 of the user are indicated by lines 35 to 39, inclusive, and line 62 in Figs. 1 and 2. The user of the invention is, therefore, able to place the image of the reticle 6 of the collimator sight in line with the aiming post 50 during night indirect firing of a mortar or cannon, by turning knobs 11 and 12, by means of which the azimuth and the elevation of the collimator sight 2 may be adjusted or altered.

I claim:

1. Means for controlling the indirect fire of cannon comprising an aiming post on which is mounted a converging lens and light reflecting means substantially in the focal plane of said converging lens, said aiming post with the said converging lens and reflecting means thereon being positioned at a distance from the cannon; a collimator sight on a traversing part of the cannon, said collimator sight having a converging lens and a reticle in the focal plane thereof, means for illuminating said reticle, a plane reflector which partly reflects and partly transmits light inclined to the direction of the principal axis of the converging lens of the said collimator sight and so positioned with respect to the means for illuminating the said reticle that light is reflected to the converging lens mounted on said aiming post, and said plane reflector also being so disposed with respect to the collimator sight that an eye of an observer near the converging lens of the collimator sight may establish a line of sight exteriorly of said collimator sight through said plane reflector to receive light from said illuminating means reflected by the reflecting means in the focal plane of the converging lens mounted on the aiming post and at the same time receive collimated light rays from the converging lens of the collimator sight.

2. Means for controlling the indirect fire of cannon comprising a collimator sight having a converging lens and a reticle in the focal plane thereof, illuminating means for said reticle, a plane reflector which partly reflects and partly transmits light inclined at an angle to the direction of the principal axis of the converging lens of the said collimator sight, said reflector being so positioned with respect to the said illuminating means for the reticle that light is reflected therefrom towards the virtual image seen by the eye of an observer positioned with respect to the said converging lens to receive collimated light rays therefrom, and the said reflector extending beyond the exterior portions of the collimator sight so that the eye of an observer may establish a line of sight exteriorly of said collimator sight to a distant object through said reflector and at the same time receive collimated light rays from the said converging lens.

3. In combination with a collimator sight having a converging lens, a reticle in the focal plane of said lens, and illuminating means for said reticle, a plane reflector which partly reflects and partly transmits light positioned with respect to said illuminating means so as to reflect light therefrom towards the virtual image seen by the eye of an observer positioned before said converging lens, said plane reflector being so disposed as to enable a line of sight to be established exteriorly of said collimator sight through said plane reflector by an eye of an observer positioned before said converging lens at a position to receive light rays therefrom.

LEO H. BROWN.